US006787034B2

(12) United States Patent
Noland et al.

(10) Patent No.: US 6,787,034 B2
(45) Date of Patent: Sep. 7, 2004

(54) COMPOSITIONS FOR REMOVING HYDROCARBONS AND HALOGENATED HYDROCARBONS FROM CONTAMINATED ENVIRONMENTS

(75) Inventors: Scott Noland, Arvada, CO (US); Bob Elliott, Aurora, CO (US)

(73) Assignee: Remediation Products, Inc., Golden, CO (US)

( * ) Notice: Subject to any disclaimer, the term of this patent is extended or adjusted under 35 U.S.C. 154(b) by 0 days.

(21) Appl. No.: 10/194,946

(22) Filed: Jul. 12, 2002

(65) Prior Publication Data

US 2004/0007524 A1 Jan. 15, 2004

(51) Int. Cl.⁷ .................................................. C02F 3/00
(52) U.S. Cl. ..................... 210/610; 210/611; 210/615; 210/616; 210/617; 210/631; 210/763; 502/185
(58) Field of Search ................. 210/610–611, 615–617, 210/631, 763; 502/185

(56) References Cited

U.S. PATENT DOCUMENTS

| | | | | |
|---|---|---|---|---|
| 4,478,954 A | * | 10/1984 | Connolly et al. | 518/700 |
| 5,403,809 A | | 4/1995 | Miller et al. | 502/413 |
| 5,427,944 A | | 6/1995 | Lee et al. | 435/262.5 |
| 5,436,211 A | * | 7/1995 | Erbel | 502/56 |
| 5,733,067 A | | 3/1998 | Hunt et al. | 405/128 |
| 5,750,036 A | | 5/1998 | Sivavec | 210/747 |
| 5,833,855 A | | 11/1998 | Saunders | 210/611 |
| 6,242,663 B1 | | 6/2001 | Ponder et al. | 588/205 |
| 6,337,019 B1 | | 1/2002 | Razavi-Shirazi | 210/610 |

OTHER PUBLICATIONS

PCT International Search Report, PCT/US03/20735 (Oct. 14, 2003).
H.M. Ehrhardt and H.J. Rehm, *Appl. Microbiol. Biotechnol.* (1985) 21:32–36.
Y. Sakakibara and D. Kamimura, *Activated Carbon and Other Support Media Used for Biobarriers,* pp 113–119.
A. Tiehm, et al., *Activated Carbon and Other Support Media Used for Biobarriers.*

* cited by examiner

Primary Examiner—Chester T. Barry
(74) Attorney, Agent, or Firm—Steven C. Petersen; Sarah J. Smith; Hogan & Hartson LLP

(57) ABSTRACT

The present invention provides a supported catalyst for in situ remediation of soil and/or groundwater contaminated with a halogenated hydrocarbon comprising an adsorbent impregnated with zero valent iron, wherein the adsorbent is capable of adsorbing the halogenated hydrocarbon. This invention further provides a bioremediation composition for in situ bioremediation of soil and/or groundwater contaminated with hydrocarbons, comprising an adsorbent capable of adsorbing said hydrocarbons, a mixture of facultative anaerobes capable of metabolizing said hydrocarbons under sulfate-reduction conditions, a sulfate-containing compound that releases sulfate over a period of time, and a nutrient system for promoting growth of said anaerobes, wherein said nutrient system includes a sulfide scavenging agent.

13 Claims, No Drawings

COMPOSITIONS FOR REMOVING HYDROCARBONS AND HALOGENATED HYDROCARBONS FROM CONTAMINATED ENVIRONMENTS

BACKGROUND OF THE INVENTION

1. Field of the Invention

The present invention relates to compositions and methods for in situ remediation of contaminated environments, and particularly to the remediation of soil and/or groundwater contaminated with halogenated hydrocarbons and bioremediation of soil and/or groundwater contaminated with hydrocarbons.

2. Description of the State of Art

With increased concerns over protecting the environment and public health and safety, the identification and removal of contaminant materials in the environment, and especially from the groundwater supply, has become one of the most important environmental concerns today. Years of unregulated dumping of hazardous materials have severely contaminated the groundwater in many areas, creating significant health concerns and causing extensive damage to the local ecosystem. As a result, in recent years significant emphasis has been placed upon the clean-up and remediation of contaminated groundwater and the environment surrounding dump sites, which has lead to the creation of a new industry of environmental clean-up and remediation. However, conventional technologies currently being used for remediation for contaminated sites often are very expensive, can require years to perform, and are not always effective.

Because of the widespread use of both chlorinated solvents and petroleum hydrocarbons, contaminated ground water has been found in many sites around the world. Chlorinated solvents, such as trichloroethane (TCE) and perchloroethylene (PCE), are used for such purposes as dry cleaning, and as degreasers and cleaners in a variety of industries. Petroleum hydrocarbons commonly found in ground water include the components of gasoline, such as benzene, toluene, ethylbenzene, and xylene. Other common contaminants of ground water include naphthalene and chlorinated solvents. Additional groundwater and soil contaminants comprise polycyclic aromatic hydrocarbons (PAHs) created from combustion, coal coking, petroleum refining and wood-treating operations; and polychlorinated biphenyls (PCBs), once widely used in electrical transformers and capacitors and for a variety of other industrial purposes, pesticides, and herbicides.

Various ex situ and in situ methods have been utilized for the treatment, remediation or disposal of contaminated soil. Ex situ methods generally include permanent removal of the contaminated soil to a secure landfill, incineration, indirect thermal treatment, aeration, venting, and air sparging. Removal of contaminated soil to landfills is no longer an attractive alternative on account of the high excavation, transportation and disposal costs, and because of the potential for residual liability. Incineration and indirect thermal treatment can be achieved either on-site or off-site, but in either case involves excavation, handling and treatment of substantially all of the contaminated soil as well as significant amounts of soil adjacent to the contaminated soil. The soil must then either be transported to the treatment facility or else the treatment apparatus must be installed on-site. Other elaborate and expensive techniques that have been utilized involve excavation and treatment of the contaminated soil using multistep unit operations for separating and recovering the soil from the contaminants.

Additional existing clean-up methods and technologies include "pump and treat" methods in which contaminated groundwater is pumped to the surface, cleaned chemically or by passing the groundwater through a bioreactor, and then reinjected into the groundwater. Such a process generally is carried out over a long period of time, typically one to ten years or more. A common remediation treatment for ground water contaminated with chlorinated hydrocarbons involves pumping the water out of the well or aquifer, volatizing the contaminants in an air stripping tower, and returning the decontaminated water to the ground site. A related type of environmental remediation is the "dig and haul" method in which contaminated soils are removed and then treated or land filled.

The biggest problem with pump and treat systems is that, over time, they become more and more inefficient, so that stable residual concentrations become established. When this happens, the system is said to be "flat-lined" and very little further benefit is obtained. In addition, channeling often occurs so that large pockets of contamination are left behind, and rebound frequently occurs after the pumps are turned off.

A wide variety of materials and methods have been evaluated for in situ remediation chlorinated hydrocarbons, including zero valent iron (ZVI), potassium permanganate, and hydrogen peroxide. ZVI renders the chlorinated hydrocarbon less toxic by reductive dehalogenation, i.e., by replacement of chlorine substituents with hydrogen. In this method, reactive walls are constructed by digging a trench across the plume migration path and filling it with iron filings. Sheet piling or some other means of directing the flow of groundwater is used to direct contaminated groundwater through the filing wall. The chlorinated hydrocarbons react with the elemental iron as the groundwater flows through the wall, and ideally, clean water emerges on the down gradient side of the wall. The disadvantage of the wall method lies in the difficulty of introducing large volumes of solid reactive material, such as iron particles, at effective depths. Conventional excavation methods generally limit the practical working depth to about 30 feet, whereas ground water contaminants are found at depths as great as 300 feet.

Oxygen release materials (ORMs) are compositions such as intercalated magnesium peroxide that release oxygen slowly and facilitate the aerobic degradation of hydrocarbon contaminants in situ. ORM's are most effective when used to polish up after a mechanical system has flat-lined and are least effective at new sites where no other remedial measures had been implemented. They are disadvantaged in that ORMs are expensive, and large amounts are required for complete oxidation. Additionally, multiple treatments are often required in order to achieve targeted cleanup goals, and two or three years may be needed to complete the process.

Hydrogen Release Compound® (HRC) is an alternative option for the in situ remediation of chlorinated hydrocarbons under anaerobic conditions via reductive dehalogenation. When in contact with subsurface moisture, HRC® is hydrolyzed, slowly releasing lactic acid. Indigenous anaerobic microbes (such as acetogens) metabolize the lactic acid producing consistent low concentrations of dissolved hydrogen. The resulting hydrogen is then used by other subsurface microbes (reductive dehalogenators) to strip the solvent molecules of their chlorine atoms and allow for further biological degradation. HRC® is injected into the affected environment under pressure and each treatment lasts for roughly six to nine months. Like ORMs, HRC® is expensive, and large amounts are required for complete degradation. Additionally, multiple treatments are often required in order to achieve targeted cleanup goals, and two or three years may be needed to complete the process.

Another emerging clean-up technology is "bioremediation," in which natural or genetically engineered microorganisms are applied to contaminated sites such as groundwater, soils or rocks. In this technique, specialized strains of bacteria are developed which metabolize various hydrocarbons such as gasoline, crude oil, or other hydrocarbon-based contaminates and gradually reduce them to carbon dioxide and water. However, such bacterial remediation requires that the bacteria and the hydrocarbon be brought into intimate contact under conditions in which the bacteria will act to metabolize the hydrocarbons. This requires extensive labor and effort to spread the bacteria on the soil and then to continually work and rework the contaminated area, turning and tilling the soil, until such time as the bacteria have been brought substantially into contact with all of the contaminated hydrocarbon particles. An additional drawback has been the ineffective spreading of injected bacteria due to clogging around the wells due to adsorption and growth of the bacteria about the wells.

The above-described technologies share one or more of the following drawbacks. (1) Long periods of time are required for sustained reduction in contaminant concentrations to be realized. (2) Although reductions can be realized, regulatory cleanup standards or goals for soil and groundwater are seldom attained. (3) Performance is inconsistent and highly dependent on site conditions and contaminant levels. (4) With respect to active systems, contaminants are often removed from one formation (groundwater for example) and then released into another, such as air. As a result, contaminants are not destroyed, just moved from one place to another. (5) With respect to passive systems for treatment of chlorinated solvents, by-products are often released that are more toxic than the original contaminants, creating a transient condition more egregious than what existed before treatment.

There is still a need for remediation processes to effectively clean up soil and/or groundwater contaminated with hydrocarbons, and/or halogenated hydrocarbons, that is rapid, cost effective, and does not release toxic by-products into the soil, air or groundwater.

SUMMARY OF THE INVENTION

The present invention provides compositions and methods for in situ soil and/or groundwater remediation that can reduce contaminant concentrations quickly to regulatory cleanup standards. The compositions and methods work in a variety of soil and groundwater conditions and are applicable for the remediation of a variety of contaminants. The methods and compositions of this invention do not release toxic by-products into the soil, groundwater or air, and have no impact on soil properties or groundwater quality. The compositions of this invention are cost effective in that they remain active for an extended period of time so that only a single treatment is required.

Accordingly, one aspect of this invention provides a composition which, when added to a site such as soil and/or groundwater contaminated with one or more halogenated hydrocarbon, adsorbs the halogenated hydrocarbons and reduces them to less innocuous by-products. More specifically, one embodiment of this invention provides a supported catalyst for in situ remediation of soil and/or groundwater contaminated with a halogenated hydrocarbon comprising an adsorbent impregnated with zero valent iron, wherein the adsorbent is capable of adsorbing the halogenated hydrocarbon contaminants as well as the intermediate by-products resulting from the degradation of the contaminants.

Another aspect of this invention provides a method for the remediation of an environment contaminated with halogenated hydrocarbons, comprising adding a supported catalyst of this invention to one or more sites of said contaminated environment, wherein reductive dehalogenation of the halogenated hydrocarbon compounds is achieved.

This invention further provides a bioremediation composition which, when added to water and/or soil contaminated with petroleum or other hydrocarbons, will adsorb hydrocarbons from the soil and/or water and degrade the hydrocarbons. More specifically, this invention provides a bioremediation composition comprising an adsorbent capable of adsorbing said hydrocarbons, a mixture of facultative anaerobes capable of metabolizing said hydrocarbons under sulfate-reduction conditions, a sulfate-containing compound that releases sulfate over a period of time, and a nutrient system for promoting growth of said anaerobes, wherein said nutrient system includes a sulfide scavenging agent.

Another aspect of this invention provides a method for the bioremediation of an environment contaminated with hydrocarbons, comprising adding a bioremediation composition of this invention to one or more sites of said contaminated environment, wherein the mixture of facultative anaerobes metabolizes the hydrocarbon contaminants.

Additional advantages and novel features of this invention shall be set forth in part in the description and examples that follow, and in part will become apparent to those skilled in the art upon examination of the following or may be learned by the practice of the invention. The objects and the advantages of the invention may be realized and attained by means of the instrumentalities and in combinations particularly pointed out in the appended claims.

DETAILED DESCRIPTION OF THE INVENTION

This invention relates to compositions and methods for in situ remediation of environments such as soil or groundwater contaminated with hydrocarbons or halogenated hydrocarbons. The compositions and methods of this invention can reduce contaminant concentrations quickly to regulatory cleanup standards and work in a variety of soil and groundwater conditions. The methods and compositions of this invention do not release toxic by-products into the soil, groundwater or air, and have no impact on soil properties or groundwater quality. The compositions of this invention remain active for an extended period of time so that only a single treatment is required. The methods and compositions of this invention are applicable for the remediation of a variety of contaminants, and are reasonably cost effective relative to existing remedies.

More specifically, one embodiment of this invention provides a supported catalyst for the reductive dehalogenation of halogenated hydrocarbons comprising an adsorbent impregnated with zero valent iron, wherein the adsorbent has an affinity for halogenated hydrocarbons. The adsorbent can be any material having an affinity for, and therefore capable of adsorbing, halogenated hydrocarbons. In addition, the adsorbent is capable of adsorbing toxic intermediate by-products produced by the reductive dehalogenation of the contaminants (e.g., intermediates such as dichloroethane and vinyl chloride intermediate by-products of trichloroethane decomposition). The adsorbent provides a means for concentrating contaminants into a new matrix where a high surface area of iron is available, as discussed hereinafter in detail. The supported catalysts of this invention accomplish treatment of halogenated hydrocarbons in soil and groundwater by degrading halogenated hydrocarbon contaminants and their toxic intermediate by-products into harmless by-products (e.g., ethane, ethyne, etc.).

The supported catalysts of this invention are prepared using an adsorbent having a high surface area per unit weight and a high affinity for halogenated hydrocarbons. Suitable adsorbents for purposes of this invention include, but are not limited to, activated carbon, vermiculite, alumina, and zeolites. Thus, while the method of preparing the supported catalysts of this invention is described utilizing activated carbon as the adsorbent, it is to be understood that the methods and supported catalysts of this invention are not limited to this adsorbent. The ability of activated carbon to adsorb organics from water enhances its utility as a support. However, while the carbon can trap hydrocarbon contaminants, carbon by itself is not stable over long periods, i.e., it is subject to erosion, etc., in which case the contaminants move with the carbon and are not truly trapped and removed.

In one non-limiting embodiment, the supported catalyst comprises activated carbon as the support impregnated with zero valent iron. Activated carbon provides an efficient matrix for adsorption of the chlorinated hydrocarbon contaminants. Impregnating the activated carbon with the zero valent iron provides sub-micron deposits of iron within the pore structure of the carbon, maximizing the metal's available surface area and placing the metal where the concentration of adsorbed contaminant molecules is the highest. Accordingly, the supported catalyst allows efficient contact of the iron with adsorbed chemicals contaminants, since the iron will be in close proximity to the contaminant. The supported catalysts of this invention accomplish treatment of chlorinated hydrocarbons in soil and groundwater by degrading these chemicals into harmless by-products.

Activated carbons are manufactured from a broad spectrum of material, including, but not limited to, coal, coconut shells, peat and wood. The supported catalysts of this invention may be produced with virtually any source of activated carbon. All that is needed are minor adjustments in system design parameters to account for the different forms of carbon. When the product is used for remediation of groundwater, acid-washed carbons are preferred, since the acid wash removes any extraneous metals that may be of environmental concern from the carbon.

When the adsorbent is activated carbon, available surface areas for adsorption range from about 800 $m^2$/gm to 1800 $m^2$/gm. Some loss of carbon surface area may occur during the impregnation process, but testing has shown that the loss is not significant when measured by adsorption isotherms. In one embodiment, the surface area of the zero valent iron in the supported catalyst of this invention ranges from about 50 to 400 $m^2$/(gm-deposited iron). The weight percent of iron deposited within the carbon matrix ranges from about 1 percent to 20 percent by weight of iron.

As described above, the contaminants are initially adsorbed by the activated carbon and then degraded through a reductive dechlorination mechanism. However, toxic reaction by-products such as vinyl chloride and cis-dichloroethene are formed during the treatment process. In conventional remediation systems, even though these by-products will react with the iron, they do so at a reduced rate, and concentrations can initially rise. In fact, fairly large accumulations can occur, creating a more acute risk to the environment than that which originally existed. One of the advantages of the supported catalyst of this invention is that these toxic by-products are also readily adsorbed by the activated carbon of the supported catalyst. As a result, little if any by-product escapes from the carbon matrix and groundwater quality is protected throughout the cleanup lifecycle. Further, the supported catalyst degrades the intermediate by-products to non-toxic by-products such as ethane, ethene and ethyne.

Manufacture of the supported catalysts involves impregnation of an adsorbent such as activated carbon material with metallic iron. These catalysts can be prepared using a variety of procedures known to those skilled in the art. One method of producing a supported catalyst of this invention comprises mixing the adsorbent with a calculated amount of a hydrated iron salt such as ferric nitrate while warming to melt the hydrated iron salt. The iron can be an iron (II) or an iron (III) salt. The mixture is dried and pyrolyzed to decompose the iron salt to iron oxide, forming an intermediate product comprising the adsorbent impregnated with a form of iron oxide. The intermediate product is then subjected to reduction conditions to reduce the iron oxide to elemental iron, thereby producing an adsorbent impregnated with elemental iron.

A second method for preparing the supported catalyst involves a slow precipitation of goethite (iron hydrogen oxide) from a solution of an iron salt (e.g., ferrous sulfate) by addition of a dilute sodium bicarbonate solution. The precipitation is carried out with vigorous mixing in a suspension of an adsorbent such as activated carbon. An intermediate product formed comprising the adsorbent impregnated with a form of iron oxide. This intermediate product is then washed, dried, and finally reduced to convert the iron oxides to elemental iron, thereby producing an adsorbent impregnated with elemental iron.

The supported catalysts of this invention may further comprise another reactant in addition to, or in place of, the iron deposited within the pores of the supporting adsorbent matrix. Accordingly, other supported catalysts of this invention include adsorbents impregnated with iron and/or other metals including, but not limited to, aluminum, magnesium, platinum, palladium, nickel, zinc, copper, cobalt, chromium, molybdenum, and manganese.

For example, carbon impregnated with aluminum is highly effective in adsorbing and degrading methylene chloride. In one embodiment, the effectiveness of the aluminum-impregnated carbon can be enhanced by increasing the pH of the supported catalyst to a basic pH, such as by adding a small percentage of magnesium hydroxide to the supported catalyst.

The supported catalysts of this invention can be applied to treatment of water contaminated with a variety of water miscible or soluble halogenated organic compounds. Chlorinated solvents are particularly common contaminants in aquifers and other subsurface water-containing environments. Contaminants that may be effectively treated include halogenated solvents such as, but not limited to, (TCE), dichloroethylene (DCE), tetrachloroethylene, dichloroethane, trichloroethane, perchloroethene (PCE), vinyl chloride (VC), chloroethane, carbon tetrachloride, chloroform, dichloromethane and methyl chloride. Other classes of contaminants that may be effectively treated include brominated methanes, brominated ethanes, brominated ethenes, fluorochloromethanes, fluorochloroethanes, fluorochloroethenes, polychlorinated biphenyls (PCBs), and pesticides.

This invention further provides a method of remediating a site contaminated with halogenated hydrocarbons, comprising injecting a supported catalyst of this invention into one or more locations of the contaminated site. Illustrative examples of contaminated environments that can be treated with a supported catalyst of this invention include, but are not limited to, soil, sediment, sand, gravel, groundwater, aquifer material, and landfills. For example, in one embodiment the supported catalyst can be injected into multiple sites within an aquifer, as described in Example 3. In this embodiment, the application method results in a substantially homogeneous distribution of the supported catalyst in the contaminant plume, as opposed to creating a barrier or filled trench as in conventional methods. Thus, the remediation method according to the embodiment described in Example 3 using a supported catalyst does not rely on groundwater diffusion for effective treatment. Rather, the adsorbent component of the supported catalyst concentrates the contaminants within the adsorbent matrix where a high surface area of iron is available, thereby increasing the rate of contaminant degradation. Contaminated ground water in the site subsequently contacts the supported catalyst, whereby reductive dehalogenation of the halogenated hydrocarbon compounds is achieved.

The supported catalyst of this invention provides a number of advantages over conventional remediation products and methods. For example, it rapidly reduces concentrations of contaminants in groundwater so that regulatory standards can be approached or achieved in a short time frame (e.g., within several days or a few weeks, versus several months or years with conventional methods). In addition, the supported catalyst is non-toxic, does not decompose over time, and toxic degradation by-products are not released, so groundwater quality is protected throughout treatment. The supported catalyst has the ability to treat a variety of chlorinated chemicals and is effective in all types of soil and groundwater conditions. It remains active for an extended period of time so that typically only a single treatment is required. The material is easy to use and does not require any special safety controls or equipment for installation.

This invention further provides a bioremediation composition for in situ bioremediation of environments contaminated with hydrocarbons. The vast majority of sites contaminated with fuel hydrocarbons are naturally in an anaerobic state. The bioremediation composition of this invention takes advantage of this condition and is designed to promote anaerobic oxidation of hydrocarbons through a sulfate-reduction mechanism. In addition, the bioremediation composition of this invention comprises an adsorbent having an affinity for hydrocarbon contaminants, thereby providing a means for concentrating the contaminants and increasing the rate of bioremediation.

Accordingly, a bioremediation composition of this invention for in situ bioremediation of an environment contaminated with hydrocarbon comprises an adsorbent capable of adsorbing hydrocarbons, a mixture of two or more species of facultative anaerobes capable of metabolizing said hydrocarbons under sulfate-reduction conditions, a sulfate-containing compound that releases sulfate ions over a period of time, and a nutrient system for metabolism of said facultative anaerobes, wherein said nutrient mixture includes a sulfide scavenging agent.

An illustrative example of a bioremediation composition of this invention comprises a mixture of the ingredients listed in Table 1.

TABLE 1

| Ingredient | Composition (wt %) |
| --- | --- |
| Adsorbent | 51.3 to 77 |
| Micronutrients | 3.8 to 10.2 |
| Sulfate-containing compound | 19.2 to 38.5 |
| Mixture of Facultative anaerobes | $1 \times 10^8$ CFU/gm-carbon |

The adsorbent provides a means for concentrating the mixture of facultative anaerobes at the site of contamination. In addition, the adsorbent provides an efficient matrix for adsorbing and thus concentrating the hydrocarbon contaminants. As a result, the rate of bioremediation is dramatically increased relative to rates obtained using conventional methods. In one embodiment, the adsorbent is activated carbon, which has a high affinity for hydrocarbons. In addition, activated carbon has an affinity for facultative anaerobes, which is advantageous for in situ bioremediation where growth of the anaerobes is desired.

The mixture of facultative anaerobes comprises hydrocarbon degraders that metabolize the hydrocarbon contaminants under sulfate-reduction conditions. A facultative anaerobe is a microbe such as bacteria and fungi that can switch between aerobic and anaerobic types of metabolism. Under anaerobic conditions, they grow by fermentation or anaerobic respiration. Further, since oxygen is not toxic to facultative anaerobes, the facultative anaerobes used in the composition of this invention are not sensitive to the low levels of oxygen frequently found at contaminated sites. In one embodiment, the mixture of facultative anaerobes comprises symbiotic facultative anaerobes that work in concert with each other. That is, one type of facultative anaerobe will break down a hydrocarbon contaminant to a first intermediate, and another type of facultative anaerobe will break down the first intermediate to a second intermediate or final by-product, etc.

In one embodiment, the mixture of facultative anaerobes includes at least one anaerobe that is a sulfate-reducing bacteria. Generally, sulfate-reducing bacteria are distributed widely in nature where anoxic conditions prevail. For example, such bacteria have been found in sewage, polluted water, sediment of lakes, sea and marine muds, oil wells, and the like. In one embodiment, the composition of the present invention is designed to dramatically increase the activity of naturally occurring sulfate-reducing bacteria by introducing cultured bacteria into the contaminated environment. Rather than depending on indigenous bacteria to inhabit the injected adsorbent, an aqueous suspension of the adsorbent is blended with the mixture of facultative anaerobes that includes bacteria specifically cultured for degradation of hydrocarbons. This mixture is stirred for a short period of time prior to injecting into the contaminated site to ensure all micronutrients have dissolved to provide a homogeneous mixture. In addition, this pre-mixing provides the cultured bacteria with an advantage over indigenous bacteria, maximizing the opportunity for the cultured bacteria to predominate. By not relying on indigenous bacteria to decompose the hydrocarbon contaminants, the compositions of this invention provide a means for removing hydrocarbon contaminants in a much shorter time period.

Commercial cultured mixtures of facultative anaerobes vary over a considerable range and the amount added will depend on the source and whether it is a dry, mineral-based product, or if it is a liquid concentrate. Regardless of the source, a sufficient amount of the facultative anaerobe mixture is added so that a targeted suspension concentration of 5 to 10 million CFU (colony forming units) per milliliter is obtained.

In general, the cultured bacteria will comprise a multiple species or strains of bacteria. The species or strains of bacteria are advantageously derived from Pseudomonas, Phenylobacterium, Stenotrophomonas, Gluconobacter, Agrobacterium, Vibrio, Acinetobacter, or Micrococcus, yeasts or other genera can also be employed. Exemplary bacterial strains include *Pseudomonas pseudoalkaligenes, Phenylobacterium immobile, Stenotrophomonas maltophilia, Gluconobacter cerinus, Agrobacterium radiobacter* or *Pseudomonas alcaligenes*.

As discussed above, the bioremediation composition of this invention metabolizes hydrocarbon contaminants under sulfate-reduction conditions, wherein some or all of the facultative anaerobes reduce sulfate to hydrogen sulfide and metabolize (oxidize) at least some hydrocarbon contaminants in the process. Thus, decomposition of hydrocarbons under sulfate-reduction conditions requires a source of sulfate ions. Accordingly, the bioremediation composition of this invention includes a sulfate-containing compound. Preferably the sulfate-containing compound has a low water solubility and is non-toxic. An illustrative example of a suitable sulfate-containing compound is gypsum (calcium sulfate), which is a non-toxic, naturally occurring compound found in soil. Since gypsum has a low solubility in water, it breaks down over time to provide a slow release of sulfate ions, thus a low but persistent level of sulfate can be maintained during bioremediation using a composition of this invention. In this manner, gypsum acts as a "time released" source of sulfate ions, which is advantageous since the mixture of facultative anaerobes consumes the hydrocarbon contaminants over a period of time. As long as there is an adequate supply of dissolved sulfate, the activity of the facultative anaerobes will be optimized. Accordingly, any non-toxic sulfate-containing compound that releases sulfate ions in a manner similar to gypsum is suitable for purposes of this invention. As used herein, "nontoxic" refers to standards set forth for drinking water standards as regulated by the United States Environmental Protection Agency and defined by the Occupational Health and Safety Administration.

Low levels of micronutrients, which are needed to support growth of the cultured facultative anaerobes, are mixed in with the other components of the bioremediation composition. A suitable nutrient system for the facultative anaerobes includes a nitrogen source such as an ammonium salt, and a phosphorus source such as an alkali metal phosphate compound. Preferably, the micronutrient source does not contain sand, gravel, fillers, or other insoluble products found in commercial fertilizers. One example of a suitable micronutrient source for purposes of this invention contains nitrogen (e.g., 24 percent by weight as ammonia and ammonium nitrate in a ratio of about 2:1), phosphorus (e.g., 10 percent by weight as ammonium phosphate), potassium (e.g., 2 percent by weight as potassium chloride), sulfur (e.g., 5 percent by weight as ammonium sulfate), and iron (e.g., 2 percent by weight as ferrous sulfate). The nutrient system also includes a sulfide scavenging agent. In one embodiment, the sulfide scavenging agent is a ferrous iron salt such as iron sulfate.

After injection into the contaminated soil or groundwater, the bioremediation composition rapidly reduces concentrations of the hydrocarbon contaminants in soil and/or groundwater. Hydrocarbon contaminant molecules are adsorbed by the composition and are thus co-located together with the cultured facultative anaerobes in the pores of the adsorbent matrix. The hydrocarbon contaminant concentration within the adsorbent matrix thus becomes substantially higher than that which existed in the soil or groundwater. As a result, rates of degradation are significantly faster than rates commonly observed using current technology. As adsorbed contaminants are degraded, active sites become available to adsorb fresh contaminant, and the cycle is repeated until the microcosm runs out of food (i.e., hydrocarbons).

By-products of sulfate reduction include carbon dioxide, water, a variety of fermentation products such as light alcohols (ethanol, propyl alcohol, isopropyl alcohol, butyl alcohol, etc.) and hydrogen sulfide. In a typical installation, elevated concentrations of hydrogen sulfide do not occur because a sulfide scavenging agent (e.g., iron sulfate) is incorporated as one of the micronutrients. For example, an iron salt can scavenge hydrogen sulfide and form insoluble iron sulfide, thus preventing toxic levels of hydrogen sulfide from accumulating. Thus, transient concentrations of hydrogen sulfide are maintained well below regulatory thresholds, protecting groundwater quality.

The mixture of facultative anaerobes included in the composition of this invention is capable of biodegrading various aliphatic, aromatic and polycyclic aromatic hydrocarbons. For example, the compositions can be used to biodegrade aromatic hydrocarbons present in gasoline such as benzene, toluene, ethylbenzene, and xylenes. Examples of polycyclic aromatic hydrocarbons that can be biodegraded using the bioremediation composition of this invention generally include any of the various aromatic compounds containing multiple ring structures. Some of the most toxic (carcinogenic) aromatic hydrocarbons (polycyclic aromatics) are fairly resistant to bioremediation, requiring long periods of time for assimilation, but they are tightly held by activated carbon. Polycyclic aromatic hydrocarbons are generally present in and derived from fossil fuels, especially coal and petroleum. Relatively high concentrations of polycyclic aromatic hydrocarbons are found in coal-tar pitch, petroleum and coal-tar naphtha, and various other high-boiling point petroleum fractions, as well as various products derived therefrom including roofing pitch, sealants, road tars, asphalts, pipe coatings, water-proofing materials, dyes, pesticides, paint additives and wood preservatives. A single large spill of such materials containing high concentrations of polycyclic aromatic hydrocarbons can result in serious contamination requiring rapid remedial action. Additionally, various fuels, such as kerosene and gasoline, or other substances containing low concentrations of polycyclic aromatic hydrocarbons can have a cumulative effect. Potential applications of the invention include soil bioremediation at manufactured gas plant sites, coke oven sites, petroleum refineries, fuel depots, gas stations, and other industrial sites.

As described, in the preparation of a bioremediation composition of this invention, the facultative anaerobes and adsorbent are mixed with water for a short period of time prior to application to allow the facultative anaerobes to inhabit the pores of the adsorbent matrix prior to injection into the contaminated environment. As a result, the "adsorbent microcosm" is pre-inhabited by large numbers of facultative anaerobes tailored for rapid assimilation of fuel hydrocarbons, optimizing the opportunity of such anaerobes to dominate the "sulfate-reducing" niche over indigenous microbes.

This invention further provides a method for bioremediation of a site contaminated with hydrocarbons, comprising injecting a bioremediation composition of this invention at or within one or more locations of the contaminated site. Illustrative examples of contaminated environments that can be treated with a bioremediation composition of this invention include, but are not limited to, soil, sediment, sand, gravel, groundwater, aquifer material, and landfills. For example, in one embodiment the bioremediation composition can be injected into multiple sites within an aquifer, as described in Example 3. According to the method described in Example 3, the method of applying numerous injections throughout the contaminant plume provides a substantially homogenous distribution of the bioremediation composition. Thus, the method described in Example 3 does not rely on groundwater movement for effective removal of the contaminants, but rather the bioremediation composition adsorbs and decomposes the contaminant throughout the plume. As a result, the method of this invention is capable of remediating contaminated soil in a matter of weeks or months rather than requiring a number of years for substantially complete remediation as with conventional methods that involve the use of reactive sheets.

The bioremediation compositions of this invention provide several advantages over conventional methods and compositions for bioremediation. For example, regulatory cleanup standards can be approached very quickly compared to current techniques. The time required is dependant on soil type with silty/clay soils taking a longer period of time. In high conductivity soils (sandy or gravely soils), a 99 percent reduction in the concentration of contaminants can be achieved in a matter of days.

Another advantage of the bioremediation composition is that contaminants are fully degraded into non-toxic products such as carbon dioxide, water and methane. Further, the bioremediation product is non-toxic. Accordingly, no toxic by-products are generated, the impact to groundwater as a consequence of composition installation is incidental, and no drinking or groundwater standards are normally exceeded at any time during treatment. Soil and groundwater contamination may be treated simultaneously, and the compositions are easy to install using equipment commonly found throughout the industry.

EXAMPLE 1

Preparation of a Supported Catalyst by Low Temperature Decomposition of Metal Nitrates A measured amount of activated carbon is mixed with an associated amount of hydrated ferric nitrate calculated to provide the desired weight percentage of elemental iron in the final product. The iron salt is typically moist and on warming easily melts, so that a uniform mixture results. As the mixture is stirred, it is warmed to roughly 50° C. to melt the salt. If necessary, a small amount of water may be added to produce a mixture having a creamy consistency. The mixture is then dried at a temperature of from 90 to 110° C. so that the mixture can be crushed to a free flowing granular powder. Some decomposition of the nitrate salt occurs during this process.

The dried powder is then loaded into a furnace and heated in accordance with a temperature program while maintaining reducing conditions throughout. Initially, the temperature is slowly raised to 150 to 200° C. to completely dry the catalyst and continue degradation of the iron nitrate. The temperature continues to increase, and at 300° C., the nitrate salt is completely decomposed into oxide.

Once the nitrate is completely degraded into oxide, a reducing gas such as methane gas or hydrogen gas is introduced into the furnace atmosphere and the temperature is raised to from 550 to 800° C., completely reducing the oxide to elemental iron. Methane gas is safer to use than hydrogen and therefore is preferred. The theoretical amount of water is typically formed upon complete reduction of the oxide as the temperature rises to between 400 and 450° C.

Final properties of the catalyst are influenced by the ultimate reducing temperature. For example, when the catalyst is reduced at temperatures below 700° C. and then exposed to the air after cooling, an exothermic reaction may occur, oxidizing a portion of the reduced iron. However, when the final reduction is carried out at a high temperature, for example between about 700 and 800° C., the catalyst is stable and exposure to the air has no effect. If reduction is completed at a temperature of less than 450° C., the material can be pyrophoric. At reduction temperatures between about 450 and 700° C., various catalyst activities can be obtained.

EXAMPLE 2

Preparation of a Supported Catalyst Comprising Activated Carbon Impregnated with Elemental Iron by a Precipitation Procedure An appropriate amount of hydrated iron sulfate is dissolved in deionized water in a tank with stirring, and a measured amount of activated carbon is added. Stirring is continued after the addition is complete and a vacuum is applied to the tank to de-aerate the carbon. Once the carbon is de-aerated, a sufficient amount of a dilute solution of sodium bicarbonate is slowly added to initiate precipitation of goethite and other iron oxides onto the suspended carbon. Pressurizing the tank during addition of the bicarbonate can enhance the impregnation process. After the addition of bicarbonate is completed, mixing is continued for several more hours. The process is complete when testing of an aliquot for ferrous iron is negative. The slurry is then washed with deionized water and filtered several times. Finally, the collected catalyst is dried at 110° C. At this point, the carbon is impregnated with iron oxides and is ready for reduction.

The dried powder is loaded into a furnace and heated in accordance with a temperature program while maintaining reducing conditions throughout. Initially, the temperature is slowly raised to 150 to 200° C. to completely dry the catalyst and continue degradation of the iron nitrate. The temperature continues to increase, and at 300° C., the nitrate salt is completely decomposed into oxide.

Once the nitrate is completely degraded into oxide, a reducing gas such as methane gas or hydrogen gas is introduced into the furnace atmosphere and the temperature is raised to from 550 to 800° C., completely reducing the oxide to elemental iron. Methane gas is safer to use than hydrogen and therefore is preferred. The theoretical amount of water is typically formed upon complete reduction of the oxide as the temperature rises to between 400 and 450° C.

EXAMPLE 3

Application of a Composition of this Invention

Small diameter (e.g., about 0.75 to 2 inches in diameter) injection rods are driven to targeted depths (e.g., 5–150 feet). The depth will depend on the power of the drill rig and the hardness of the soil. Hydraulically powered direct-push drill rigs are used to pound/push the injection rod to the desired depths, and then withdraw it about 6 inches to open up a small void below the injection point. A premixed aqueous suspension of a supported catalyst or bioremediation composition of this invention is injected under pressure down the rod. Pressure is allowed to build in the formation, and slurry begins to flow out into the formation. No attempt is made to control the path of fluid flow, but rather the objective is to achieve a substantially homogeneous distribution of the suspension within the formation. The suspension tends to emanate outward in all directions from the base of the injection, and the average or effective radius of influence is controlled by the amount of fluid pumped into the rod.

After injection of the first batch of the suspension, a second (fresh) batch of the suspension can be prepared, a new injection rod installed, and the process repeated. Treatment in this fashion is continued throughout the plume, reducing concentrations of contaminants in the groundwater concentrations as treatment progresses. If one could view a cross-section of the formation, the treatment regime is intended to create a three-dimensional network of material, dispersed randomly and fairly uniformly throughout the treated formation.

Many treatment technologies, ZVI for example, only work well when installed in groundwater (saturated soils) and is not effective for treatment of vadose zone (unsaturated) soils. Because activated carbon is very effective at adsorbing organic compounds from vapor streams, the compositions of this invention are able to perform nearly as well when installed in the vadose zone. As a result the products can be used equally well for treatment of contaminated soils and groundwater.

The foregoing description is considered as illustrative only of the principles of the invention. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. Furthermore, since a number of modifications and changes will readily occur to those skilled in the art, it is not desired to limit the invention to the exact construction and process shown described above. Accordingly, all suitable modifications and equivalents may be resorted to falling within the scope of the invention as defined by the claims that follow.

The embodiments of the invention in which an exclusive property or privilege is claimed are defined as follows:

1. A composition for in situ bioremediation of soil and/or groundwater contaminated with hydrocarbons, comprising an adsorbent capable of adsorbing hydrocarbons, a mixture of facultative anaerobes capable of metabolizing said hydrocarbons under sulfate-reduction conditions, a sulfate-containing compound that releases sulfate over a period of time, and a nutrient system for promoting growth of said anaerobes, wherein said nutrient system includes a sulfide scavenging agent.

2. The composition of claim 1, wherein said adsorbent comprises activated carbon.

3. The composition of claim 1, wherein said sulfate-containing compound is calcium sulfate.

4. The composition of claim 1, wherein said facultative anaerobes are symbiotic.

5. The composition of claim 1, wherein said nutrient system includes a nitrogen source and a phosphorous source.

6. The composition of claim 1, wherein said nitrogen source is an ammonium salt and said phosphorus source is a monobasic alkali-metal phosphate.

7. The composition of claim 1, wherein said nitrogen source is ammonia and ammonium nitrate in a molar ratio of about 2.3 to 1.

8. The composition of claim 1, wherein said sulfide scavenging agent is iron sulfate.

9. The composition of claim 1, wherein said hydrocarbons are selected from the group consisting of aliphatic hydrocarbons, aromatic hydrocarbons, aliphatic alcohols, esters, ethers, and ketones, and polycyclic hydrocarbons.

10. A method for in situ remediation of soil and/or groundwater that has been contaminated with a halogenated hydrocarbon, comprising introducing into the contaminated soil an aqueous suspension of a supported catalyst comprising an adsorbent capable of adsorbing halogenated hydrocarbons and impregnated with zero valent iron.

11. The method of claim 10, wherein said introducing comprises:

(a) driving small diameter injection rods in the contaminated soil to a depth between about 5 and 150 feet;

(b) partially withdrawing said rod to open a void below the injection point;

(c) injecting said aqueous suspension under pressure down said rod until the pressure in said void increases to a point whereby said suspension emanates outward from said void; and (d) repeating steps (a) through (c) throughout said contaminated soil until a substantially homogeneous distribution of said aqueous suspension throughout said contaminated soil is obtained.

12. A method for in situ bioremediation of soil and/or groundwater that has been contaminated with a hydrocarbon, comprising introducing into the contaminated soil an aqueous suspension of composition comprising an adsorbent capable of adsorbing said hydrocarbons, a mixture of facultative anaerobes capable of metabolizing said hydrocarbons under sulfate-reduction conditions, a sulfate-containing compound that releases sulfate over a period of time, and a nutrient system for promoting growth of said anaerobes, wherein said nutrient system includes a sulfide scavenging agent.

13. The method of claim 12, wherein said introducing comprises:

(a) driving small diameter injection rods in the contaminated soil to a depth between about 5 and 150 feet;

(b) partially withdrawing said rod to open a void below the injection point;

(c) injecting said aqueous suspension under pressure down said rod until the pressure in said void increases to a point whereby said suspension emanates outward from said void; and (d) repeating steps (a) through (c) throughout said contaminated soil until a substantially homogeneous distribution of said aqueous suspension throughout said contaminated soil is obtained.

* * * * *